April 28, 1964  F. ROBINSON ETAL  3,130,844
STITCHING TOBACCO LEAVES FOR HANGING
Filed Nov. 21, 1961  6 Sheets-Sheet 1
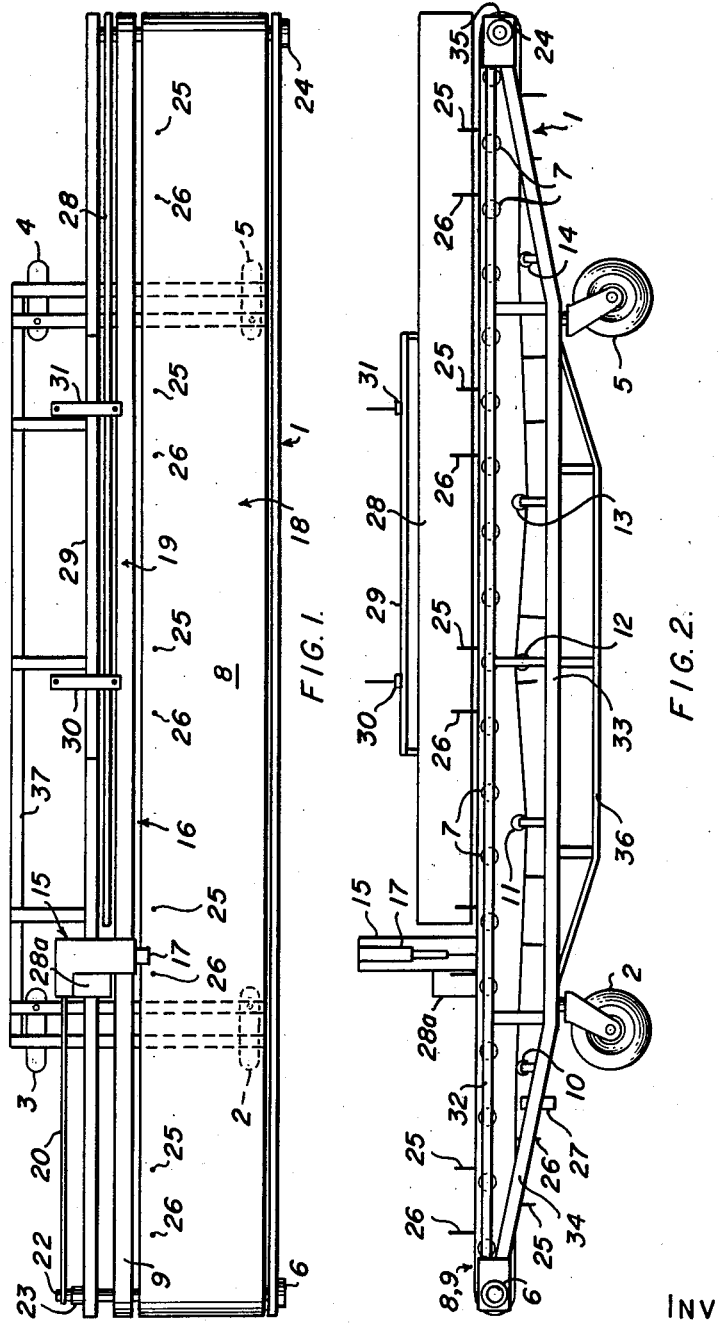
INVENTORS
FOREST ROBINSON
VICTOR LAPADAT
BY Smart & Biggar
ATTORNEYS.

INVENTORS
FOREST ROBINSON
VICTOR LAPADAT

INVENTORS
FOREST ROBINSON
VICTOR LAPADAT
BY Smart & Biggar
ATTORNEYS

April 28, 1964  F. ROBINSON ETAL  3,130,844
STITCHING TOBACCO LEAVES FOR HANGING
Filed Nov. 21, 1961  6 Sheets-Sheet 4

INVENTORS
FOREST ROBINSON
VICTOR LAPADAT
BY Smart & Biggar
ATTORNEYS.

April 28, 1964   F. ROBINSON ETAL   3,130,844
STITCHING TOBACCO LEAVES FOR HANGING
Filed Nov. 21, 1961   6 Sheets-Sheet 5

INVENTORS
FOREST ROBINSON
VICTOR LAPADAT
BY Smart & Biggar
ATTORNEYS.

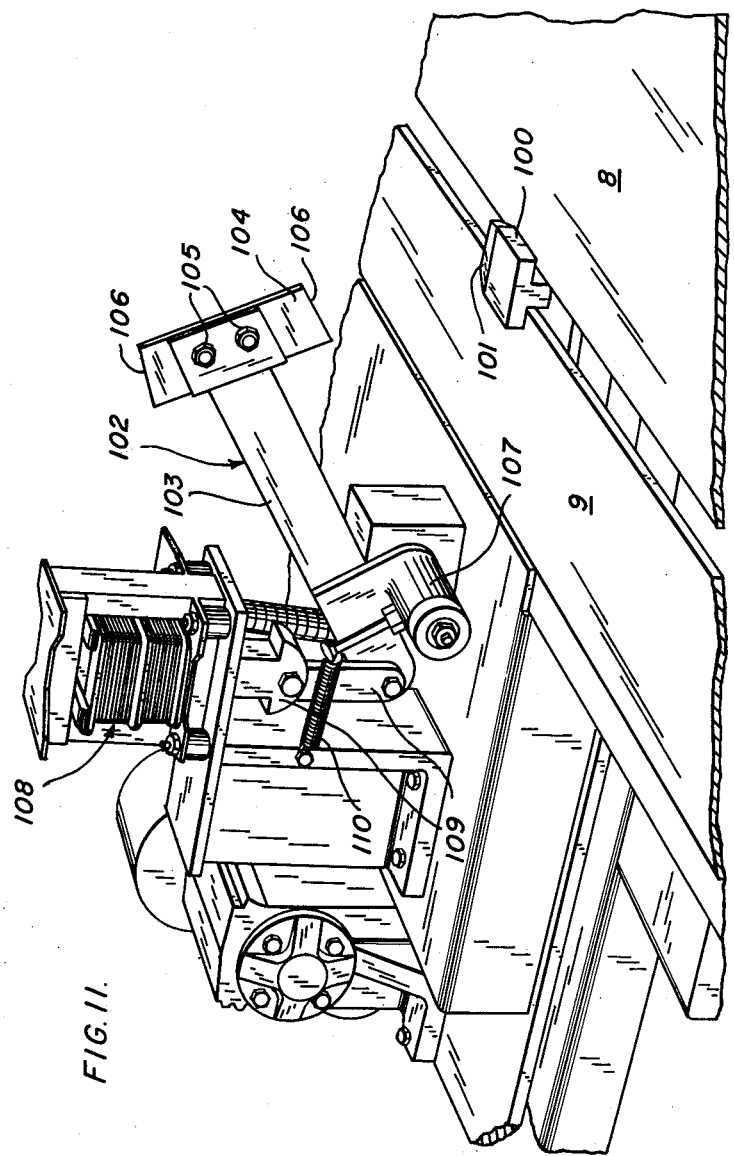

United States Patent Office 3,130,844  
Patented Apr. 28, 1964

3,130,844
STITCHING TOBACCO LEAVES FOR HANGING
Forest Robinson, Eagle, Ontario, Canada, and Victor Lapadat, P.O. Box R.R. 3, West Lorne, Ontario, Canada
Filed Nov. 21, 1961, Ser. No. 153,918
Claims priority, application Canada Apr. 21, 1961
5 Claims. (Cl. 214—152)

The present invention relates to a method and apparatus for tying or stringing tobacco leaves on laths for curing in a kiln, or for other purposes such as for hanging the leaves in storage.

For curing tobacco leaves in kilns it is the practice to attach groups of green leaves on a lath about four feet long, the laths being then placed on parallel supports in the kiln with those leaves hanging downwardly. In the manual operation of preparing such leaf-lath units, seven workers are usually employed, one to unload the leaves from "boats" onto a table, four workers to arrange the leaves in bunches or "hands," and two workers to tie the "hands" to the lath. Such an operation is costly in labour.

To reduce labour costs, it has been proposed first to tie or even stitch the leaves together and then hang them over the laths, and machines have been designed for this purpose. However, the laths prepared by these machines are unsatisfactory because the stitching is loose. To hang the laths in the curing kilns one handler has to pass them up to another handler who places them on parallel supports inside the kiln. When the laths are raised at one end the leaves slide downwardly and bunch together at one end of the lath because of the loose stitching. This problem is accentuated during removal of the laths from the kiln when the leaves are dried out, since the dried leaves tend to slip out from the stitching and drop to the ground.

The present invention overcomes the problem of sliding and bunching of the leaves, on the lath during handling, and dropping of the leaves from the lath, by positioning the leaves on the lath in the position they will occupy when the lath is hung, that is in two parallel planes with the lath lying between them adjacent the stems, and then sewing the leaves together adjacent the lath.

To achieve this result, the invention in its broadest aspect resides in a method of stitching tobacco leaves on a lath comprising the steps of randomly arranging a first row of leaves with the ends of their stems aligned, placing a lath across the arranged leaves parallel to but spaced from the aligned ends of the stems, arranging a second row of leaves in like manner to said first row but above the lath, and stitching the leaves along a line contiguous to the lath between the lath and the aligned stem ends to form a tied leaf-lath unit. Advantageously the leaves should be held firmly against the lath.

This method lends itself to forming leaf-lath units in series, the stitching material being severed between units. Another aspect of the invention resides in an apparatus for tying green tobacco leaves on laths for curing comprising a frame, a first endless movable conveyor belt mounted on the frame, a second endless movable conveyor belt mounted on the frame parallel to the first belt in the same plane but spaced laterally therefrom, the conveyor belts being adapted to provide a working surface for arrangement of the leaves, drive means to move the conveyor belts intermittently in unison and in the same direction, and stitching means operable in the space between the conveyor belts, the movement of the stitching means being synchronized with the movement of the conveyor belts whereby said belts are stationary while the leaves are impaled. Preferred embodiments of the apparatus include a vertically oscillating needle, a presser means to hold the leaves firmly against the lath, a cutting means for sewing the stitching material between laths, and an adjustable backboard for regulating the position of the leaves relative to the associated lath.

The invention results not only in a superior leaf-lath arrangement but reduces the number of handlers employed in the stitching operation. The apparatus of the invention can be operated by as few as two handlers. Moreover, the operation can be accelerated so that the two handlers are capable of producing stitched laths for up to 1½ kilns per day. If desired, increased speeds allow use of the apparatus by a greater number of handlers. By use of chain stitching, whereby the stitching material (usually ordinary string) can be removed very rapidly from the leaves on the lath after drying. Another advantage of the invention is the minimal damage to leaves during the sewing or stitching operation, especially when the apparatus is operated intermittently.

An example embodiment of the invention will now be described with respect to the accompanying drawings, in which:

FIGURE 1 is a plan view of a green leaf tobacco stitching apparatus;

FIGURE 2 is a view in elevation of the apparatus shown in FIGURE 1;

FIGURE 11 is a perspective view of the string cutter.

Figure 3:
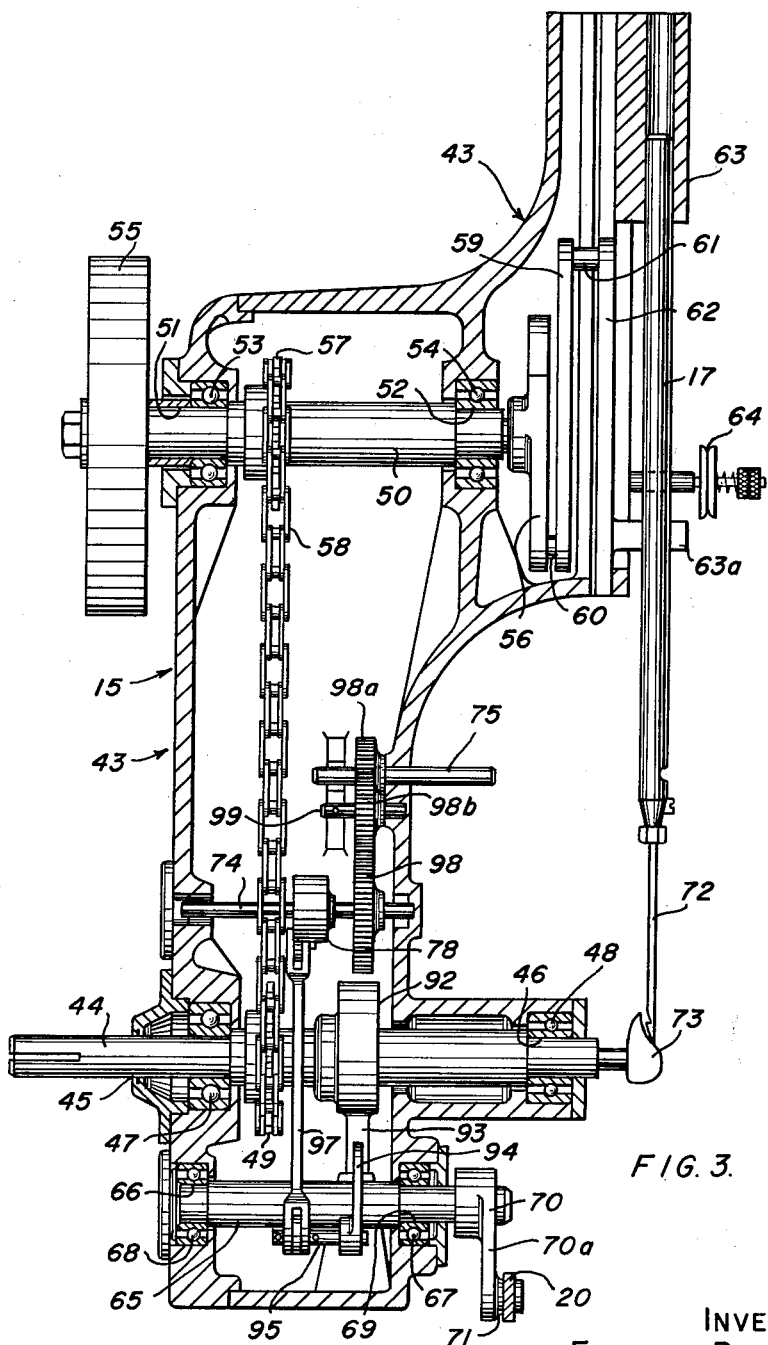
FIGURE 3 is a vertical cross-sectional view of the sewing head.

Referring first to FIGURES 1 and 2 of the drawings, the tobacco stitching apparatus comprises a rectangular frame 1 mounted on caster wheels 2, 3, 4 and 5. Two conveyor belts 8 and 9 are mounted on frame 1 by means of drive roller 6 and guide rollers 7 for directing the movement of conveyor belts 8 and 9 horizontally above frame 1, and guide rollers 10, 11, 12, 13 and 14 for directing the movement of conveyor belts 8 and 9 through the lower part of frame 1. Stitching means in the form of a sewing head 15 is mounted at one side of frame 1. The two conveyor belts 8 and 9 are spaced apart about 4 inches, as indicated at 16, to permit passage of a needle carried by sewing head 15. Rollers 6 and 7 are each divided into two zones 18 and 19, each zone being crowned to position belts 8 and 9 respectively. Drive roller 6 is actuated by a push rod 20 associated at one end with sewing head 15 and connected, at its other end, to a shaft 22 of drive roller 6 through a one-way or over-running clutch 23. This arrangement enables conveyor belts 8 and 9 to be driven intermittently.

Figure 7:
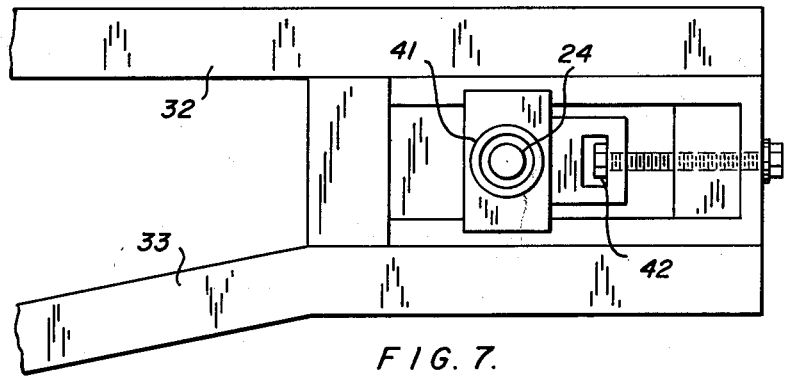
FIGURE 7 is a view in elevation of the tension adjustment for the conveyor belts.

An idler roller at the end of frame 1 remote from drive roller 6 is indicated by numeral 24. Roller 24 is adjustably mounted on frame 1 as shown in FIGURE 7, the shaft of the roller being mounted in adjustable bearings 41 which are moved as desired by adjusting bolts 42.

A series of pins 25 and 26 are mounted on belt 8 normal to the plane of the belt. Shorter pins 25 alternate with longer pins 26 in a row along the edge of belt 8 adjacent belt 9. The distance between a longer pin 26 and the next succeeding pin 25 is approximately 13 inches while the distance between that shorter pin and the next succeeding longer pin is approximately 40 inches, slightly less than the length of the usual type of lath used in the tying operation (48 inches). The longer pins 26 actuate a solenoid switch 27 mounted beneath frame 1 which operates a string cutter 28a mounted on frame 1, to be described later.

An adjustable backboard 28 is also mounted on frame 1, to one side of belt 9 and preceding the sewing head in the direction of travel of that belt. Sewing head 15 in turn precedes string cutter 28a. Backboard 28 is adjustable in a lateral direction with respect to belts 8 and 9 and carries a lath holder 29 having brackets 30 and 31 for holding a supply of laths to be used in the stitching operation.

Frame 1 consists of an upper rectangular horizontal frame member 32, on which rollers 6, 7 and 24 are mounted, and two depending frame members 33. Frame members 33 are mounted one on each side of frame member 32 through their ends 34 and 35 and support lower guide rollers 10, 11, 12, 13 and 14. A truss 36 is fixed to frame members 32 and 33 to strengthen the overall frame. Auxiliary frame 37 is connected to the side of frame 1 on which the sewing head 15, string cutter 28a, and lath rack 29 are mounted in order to widen the wheel base and balance the apparatus.

Figure 8:
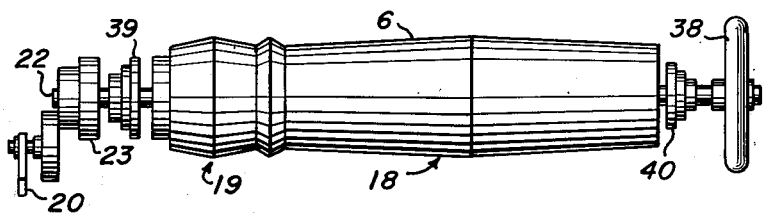
FIGURE 8 is a view in elevation of the conveyor belt drive rollers and attachments.

FIGURE 8 shows in more detail the elements associated with drive roller 6. Shaft 22, mounted in bearings 39 and 40 on frame 1, passes centrally through roller 6 and has a hand wheel 38 fixed at its far end for manually moving belts 8 and 9.

Figure 4:
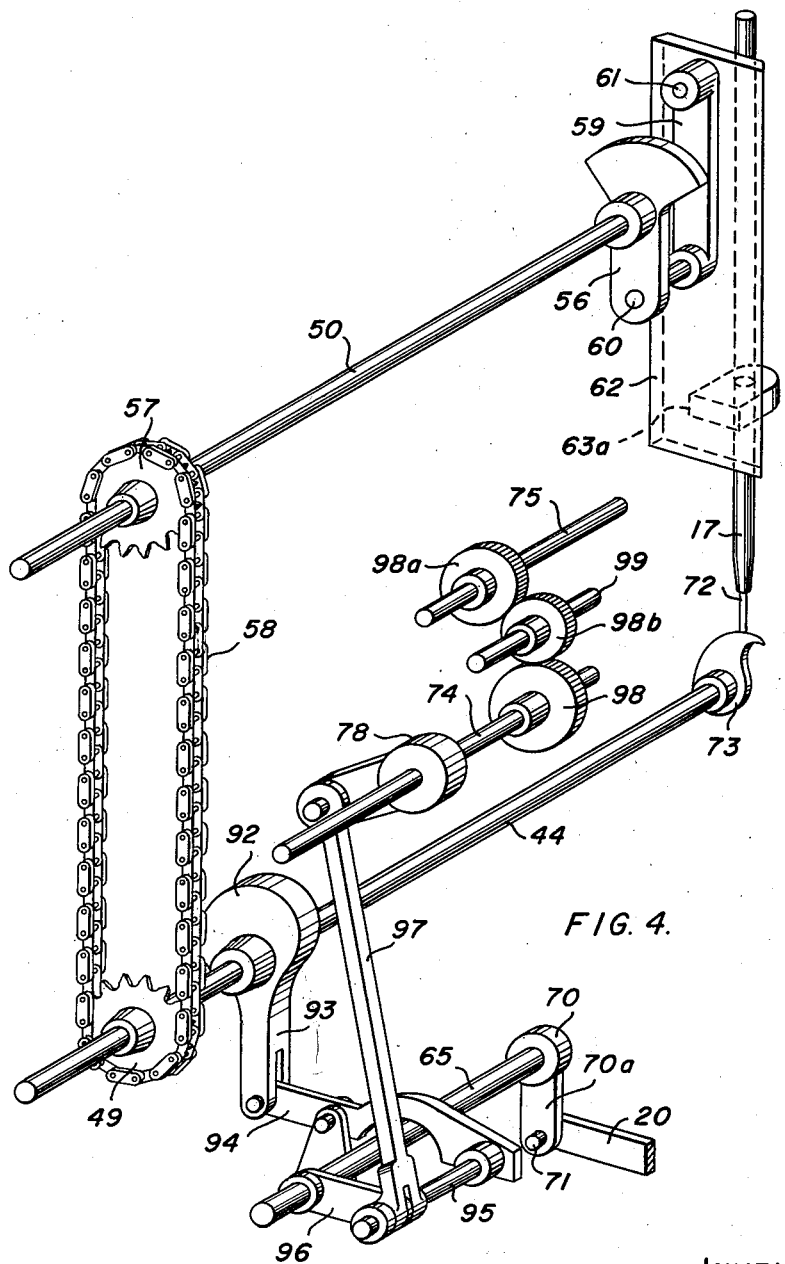
FIGURE 4 is a schematic perspective view showing the driving arrangement with the sewing head.

FIGURES 3 and 4 show the details of sewing head 15 which is mounted on frame 1 through an outer casing 43. A drive shaft 44 extends through the casing 43 at openings 45 and 46 and is mounted in bearings 47 and 48. Drive shaft 44 is connected through a gear box (not shown) at the rear of sewing head 15 to a motor of suitable power for operating the complete apparatus. A shaft 50 is mounted in the upper part of sewing head 15 in bearings 53 and 54 and extends through the casing 43 at openings 51 and 52. A fly wheel or balance wheel 55 is mounted on one end of shaft 50 and a counter-weight arm 56 is mounted on the other end of that shaft. Shaft 50 is driven by a sprocket chain 58 entrained about sprockets 49 and 57 mounted on shafts 44 and 50 respectively. A connecting arm 59 is pivoted at one end to arm 56 through pivot pin 60. At the other end arm 59 is connected by a pivot pin 61 to a movable sleeve 62 on which needle bar 17 is fixed, producing an up and down motion of the needle bar which is shown mounted in a bearing bushing 63 and clamp 63a. A string tensioner 64 is mounted on casing 43 adjacent needle bar 17.

A further shaft 65 is positioned in the lower portion of casing 43, passing through opening 66 and 67 in the casing and mounted in bearings 68 and 69. A bush 70 having an arm 70a is mounted on one end of shaft 65 external to casing 43. A pivot pin 71 mounted on the free end of arm 70a connects that arm with the push rod 20. Shaft 65 is actuated from drive shaft 44 through an eccentric 92 having an arm 93 pivoted on one end of a fulcrum arm 94 which is associated at its opposite end with shaft 65 through fixed links 95 and 96.

Two additional rotatable shafts 74 and 75 are mounted in casing 43. Shaft 74 is rotated by an over-running clutch 78 actuated from drive shaft 44 through a pivotal arm 97 associated with link 95. A gear 98 on shaft 74, a gear 98a on shaft 75, and an interconnecting gear 98b on a shaft 99 journalled in casing 43, all transmit rotation from shaft 74 to shaft 75 while changing the direction of rotation. A needle 72 is mounted at the lower end of needle bar 17, as shown in FIGURE 3. A looper 73 is mounted on the end of drive shaft 44 and continuously rotates when the machine is in operation.

Figure 9:
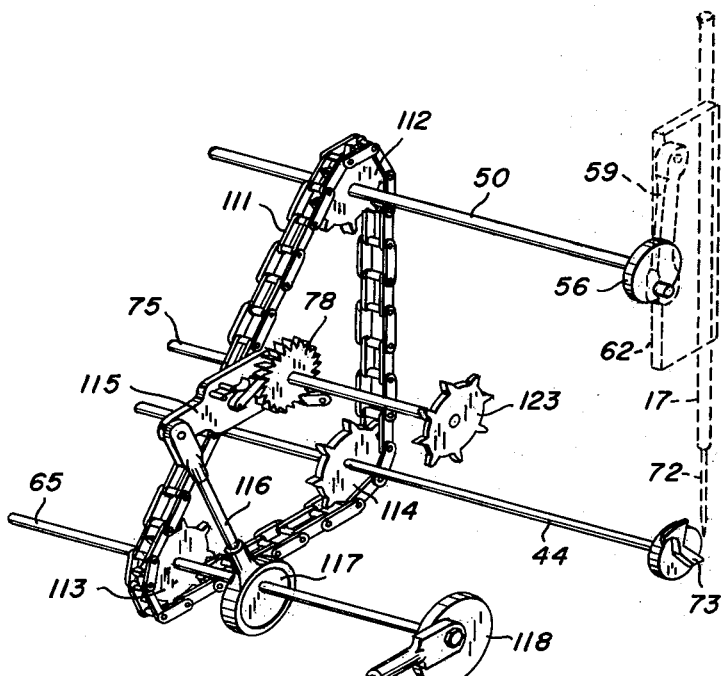
FIGURE 9 is a schematic perspective view of an alternate arrangement of the driving arrangement within the sewing head.

An alternate construction of sewing head 15 is shown in FIGURE 9 where a single sprocket chain 111 is entrained about sprockets 112, 113 and 114 mounted on shafts 50, 65 and drive shaft 44 respectively. Shaft 75 is actuated directly by an over-running clutch 78 mounted on it. Clutch 78 is actuated in turn by pivotal arms 115 and 116 off an eccentric 117 on shaft 65 which also carries an eccentric 118 actuating over-running clutch 23 through arm 20. By this construction (as by the construction shown in FIGS. 3 and 4) the intermittent rotation of shafts 75 and 22, operating presser belts 79, 80 (to be described) and conveyor belts 8, 9 respectively, are synchronized.

Figure 5:
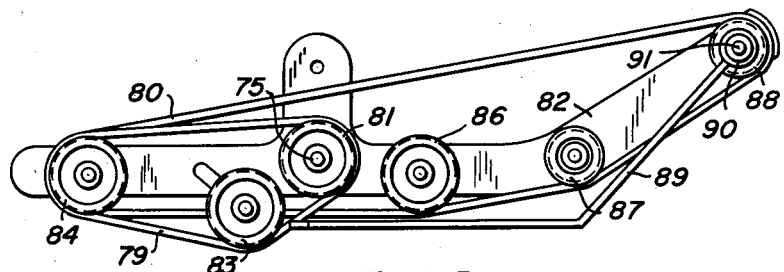
FIGURE 5 is a view in elevation of the presser element associated with the sewing head.
Figure 6:
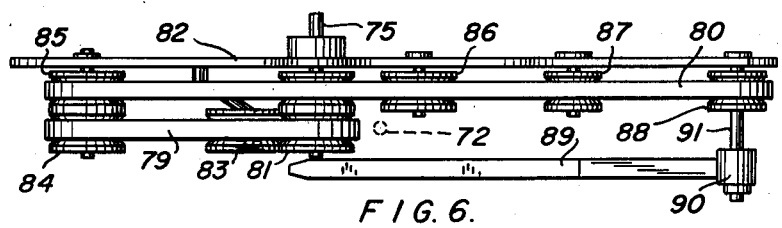
FIGURE 6 is a plan view of the presser element.

FIGURES 5 and 6 show a presser means in the form of a device consisting of a drive belt 79 and a presser belt 80 mounted on a frame 82 which is in turn mounted adjacent the end of shaft 75 projecting from a sewing head casing 43. Presser belt 80 is positioned between casing 43 and needle bar 17 above conveyor belt 9 and in line with the conveyor belt. Drive belt 79 lies in the axial plane of needle bar 17. A drive roller 81, mounted at the end of shaft 75, drives belt 79 which passes over idler rollers 83 and 84 rotatably mounted on frame 82. Belt 80 passes over idler rollers 86, 87, 88 mounted on frame 82, and also over roller 85 which is fixed to roller 84 and serves to drive belt 80. A leaf hold-down bar 89 is pivoted, at bushing 90, on shaft 91 of roller 88.

Figure 10:
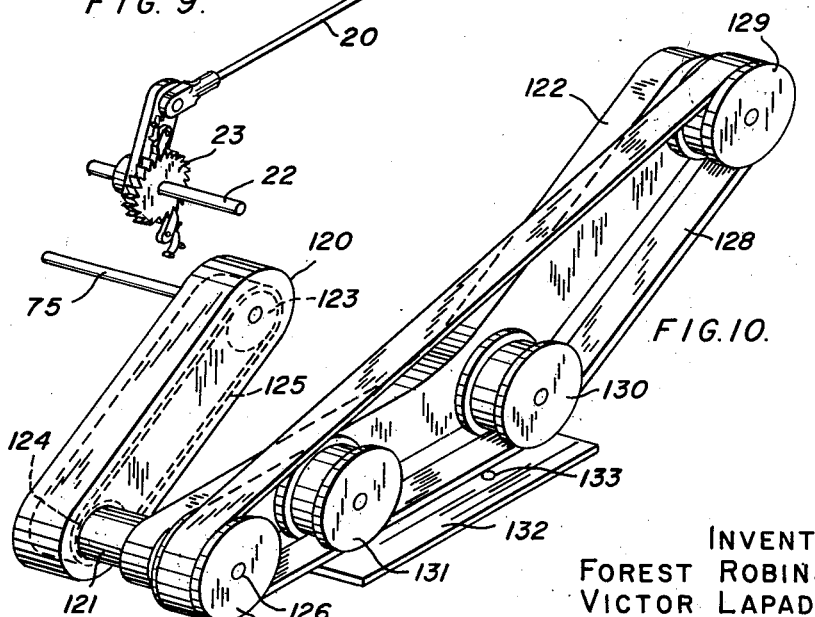
FIGURE 10 is a perspective view of an alternate embodiment of the presser element.

FIGURE 10 shows an alternate construction of the presser device. Shaft 75 carries, pivoted at its end, an elongated housing 120 which in turn carries a frame 122 pivoted to it through a hollow arm 121. Within housing 120, a sprocket 123 is mounted on shaft 75 and drives the second sprocket 124 through entrained sprocket chain 125. Passing through hollow arm 121, a shaft 126 connects sprocket 124 with a drive roller 127. A belt 128 passes around drive roller 127 and idler rollers 129, 130 and 131 rotatably mounted on frame 122. The presser device floats freely above conveyor belt 8. FIGURE 10 shows its relationship to a plate 132 mounted on frame 1 beneath belts 8 and 9 and having a needle hole 133 positioned in space 16 between the conveyor belts.

The string cutter, indicated by numeral 28 in FIGURE 1, is shown in detail in FIGURE 11 of the drawings. A hardened steel anvil 100 is fixed on frame 1 and protrudes through space 16 between belts 8 and 9. The upper surface of anvil 100 is sloped at the end facing the oncoming belts to permit the leaves to ride over it. A hammer or cutter 102 is mounted on frame 1 and consists of an arm 103 having a head 104 of tool steel fixed on the arm by removable bolts 105. For reversibility, both ends 106 of head 104 are narrow and flat. Arm 103 is pivoted at its base 107 so that it may be brought down on anvil 100. Hammer 102 is actuated by a solenoid 108 through links 109 and the solenoid is in turn actuated by switch 27. A return spring 110 keeps hammer 102 poised when solenoid 108 is not actuated.

In the operation of the apparatus green tobacco leaves are brought from the fields, for example in boats, and placed within reach of an operator who stands at the side of the machine by belt 9 opposite back board 28. If desired, two operators can be used at this point and to allow for flexibility in the speed of operation, a three speed transmission in the gear box between the motor and drive shaft 44 may be provided. The operator places about 50 leaves between pins 26 and 25 transversely across belts 8 and 9 with the ends of the stems abutting back board 28. As pins 26 and 25 are 40 inches apart, there will be considerable overlapping among the 50 leaves spread between the pins. A lath is taken from rack 29 and placed against pins 26 and 25 on top of the leaves. About 50 more tobacco leaves are spread evenly above the lath between pins 26 and 25 in the same manner as before. Belts 8 and 9, moving intermittently by the action of over-running clutch 23 on drive roller 6, carry the positioned leaves and lath under needle 72 which, oscillating continuously, stitches the stems of the leaves adjacent the lath. As the needle passes a thread through the leaves, it is merely necessary, to practice the present method, to spread the leaves on the working surface without regard to spacing between leaves, but making sure that the ends of the leaves are in substantial alignment. Thus the leaves are spaced randomly, with regard to spacing, between pins 26 and 25 and with the stem ends in substantial alignment. The action of needle bar 17 is synchronized with the movement of belts 8 and 9 so that the belts are stationary in the period when needle 72 is impaled in the leaves while the leaves are moved when needle 72 is poised above them. Oscillating needle 72 co-operates with looper 73 (rotating continuously) in a chain-stitching operation.

The presser device shown in FIGS. 5 and 10 acts to hold the leaves in position against the lath during the stitching operation so that withdrawal of needle 72 will not disturb them. In the preferred embodiment shown in FIGURE 10, the presser device is free floating and bears against the leaves only under the action of its own weight. By these constructions, tearing and bruising of the leaves is avoided.

After the leaves, tied to the lath by the sewing operation have passed underneath the pressure device, the leaf-lath unit passes over anvil 100 of the string cutter unit. Hammer 102 is synchronized to cut the string after the unit has passed over anvil 100, separating it from the next succeeding unit. The unit continues to move on belts 8 and 9 to the end of frame 1. As succeeding units reach the end of the frame they are collected and conveyed to kilns for drying.

What we claim as our invention is:

1. A method of stitching tobacco leaves on a lath comprising the steps of randomly arranging a first row of leaves with the ends of their stems substantially aligned, placing a lath across the arranged leaves substantially parallel to but spaced from the aligned ends of the stems, arranging a second row of leaves in a like manner to said first row but above the lath, and stitching the two rows of leaves along a line contiguous to the lath between the lath and the aligned stem ends to form a stitched leaf-lath unit.

2. A method of stitching tobacco leaves on a lath as defined in claim 1, wherein the leaf-lath units are formed in series on a moving conveyor with the stems of the leaves positioned normal to the direction of movement of the conveyor and including the step of cutting the stitching material at a point over-running the end of each lath to separate that lath from the next succeeding lath in series therewith.

3. A method of stitching tobacco leaves as defined in claim 1, in which the leaves are urged against the lath during the stitching step.

4. A method of stitching tobacco leaves as defined in claim 2 wherein the conveyor is moved intermittently in synchronization with the stitching step, the conveyor being stationary when the leaves are impaled.

5. A method of stitching tobacco leaves on a lath comprising the steps of randomly arranging a first row of leaves with the ends of their stems substantially aligned while advancing the leaves along a directed path of travel, placing a lath across the arranged leaves substantially parallel to but spaced from the aligned ends of the stems as the first row of leaves advances along said directed path of travel, arranging a second row of leaves in a like manner to said first row but above the lath and on the first row of leaves while the first and second rows of leaves and the lath advance in said directed path of travel, and stitching the two rows of leaves together by passing a thread through the leaves along a line contiguous to the lath between the lath and the aligned stem ends while said two rows of leaves and lath are traveling in said directed path of travel to form a stitched leaf-lath unit.

References Cited in the file of this patent

UNITED STATES PATENTS

| | | |
|---|---|---|
| 413,393 | Farmer | Oct. 22, 1889 |
| 454,097 | Warren | June 16, 1891 |
| 1,987,844 | Bass | Jan. 15, 1935 |
| 2,327,252 | Dickerson | Aug. 17, 1943 |
| 2,785,808 | Weisner | Mar. 19, 1957 |
| 2,825,474 | Coley et al. | Mar. 4, 1958 |